(12) United States Patent
Hoelz et al.

(10) Patent No.: US 8,814,368 B2
(45) Date of Patent: Aug. 26, 2014

(54) OBJECTIVE FOR A CAMERA

(71) Applicant: Carl Zeiss AG, Oberkochen (DE)

(72) Inventors: Michael Hoelz, Aalen (DE); Karl-Heinz Roesner, Essinger (DE); Peter Ruff, Esslingen (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 13/766,411

(22) Filed: Feb. 13, 2013

(65) Prior Publication Data

US 2013/0155510 A1    Jun. 20, 2013

Related U.S. Application Data

(63) Continuation of application No. PCT/EP2011/062847, filed on Jul. 26, 2011.

(30) Foreign Application Priority Data

Aug. 17, 2010    (DE) .......................... 10 2010 039 423

(51) Int. Cl.
*G02B 27/00*    (2006.01)

(52) U.S. Cl.
USPC ......................................... 359/513; 359/819

(58) Field of Classification Search
USPC ............ 359/508, 513, 819, 826, 830; 396/29, 396/535

See application file for complete search history.

(56) References Cited

U.S. PATENT DOCUMENTS

| | | | |
|---|---|---|---|
| 4,168,897 A | 9/1979 | Gates | |
| 4,440,403 A | 4/1984 | Urano et al. | |
| 5,420,656 A * | 5/1995 | Kohmoto | 396/448 |
| 6,038,087 A | 3/2000 | Suzuki et al. | |
| 6,301,060 B1 * | 10/2001 | Watanabe et al. | 359/694 |
| 6,640,053 B1 * | 10/2003 | Dirisio | 396/29 |
| 2001/0009611 A1 | 7/2001 | Akami et al. | |
| 2005/0201745 A1 | 9/2005 | Nishizawa | |
| 2005/0228226 A1 * | 10/2005 | Muckner | 600/110 |
| 2007/0122147 A1 * | 5/2007 | Hung | 396/535 |

OTHER PUBLICATIONS

English translation of Written Opinion of the international searching authority dated Oct. 21, 2011 in international patent application PCT/EP2011/062847 on which the claim of priority is based.

International Search Report dated Oct. 21, 2011 of international application PCT/EP2011/062847 on which this application is based.

English translation and Office action of the German Patent Office dated Mar. 17, 2011 in German patent application 10 2010 039 423.8 on which the claim of priority is based.

* cited by examiner

*Primary Examiner* — Frank Font
(74) *Attorney, Agent, or Firm* — Walter Ottesen P.A.

(57) ABSTRACT

An objective for a camera defines an axis and includes an inner objective element and an outer objective element at least partially surrounding the inner objective element. The inner objective element and the outer objective element conjointly define an interface and are mounted so as to be rotatable relative to each other about the axis. A sealing system is disposed at the interface between the inner objective element and the outer objective element and the sealing system includes a plastic foil in contact engagement with the inner objective element and the outer objective element.

17 Claims, 3 Drawing Sheets

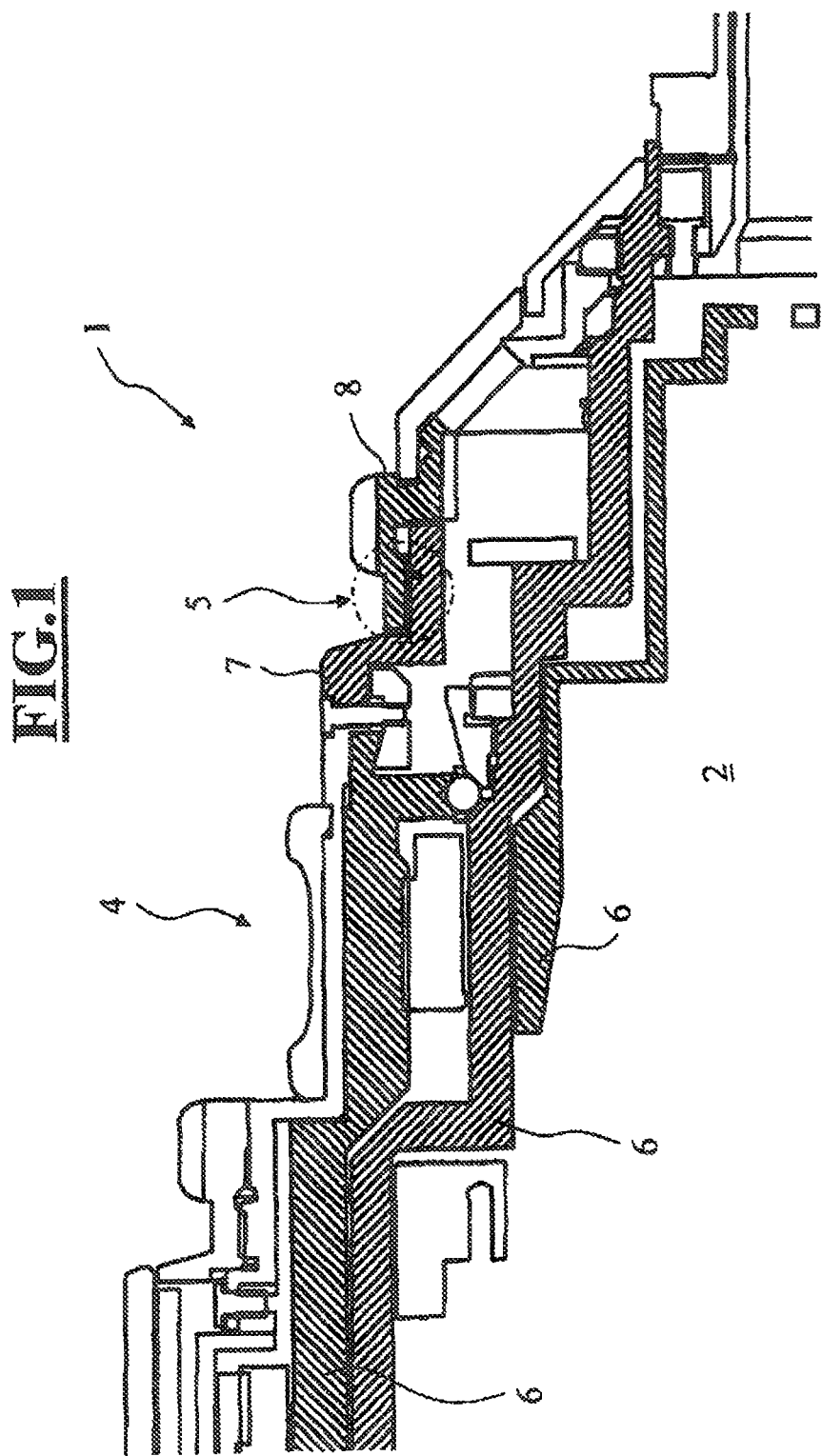

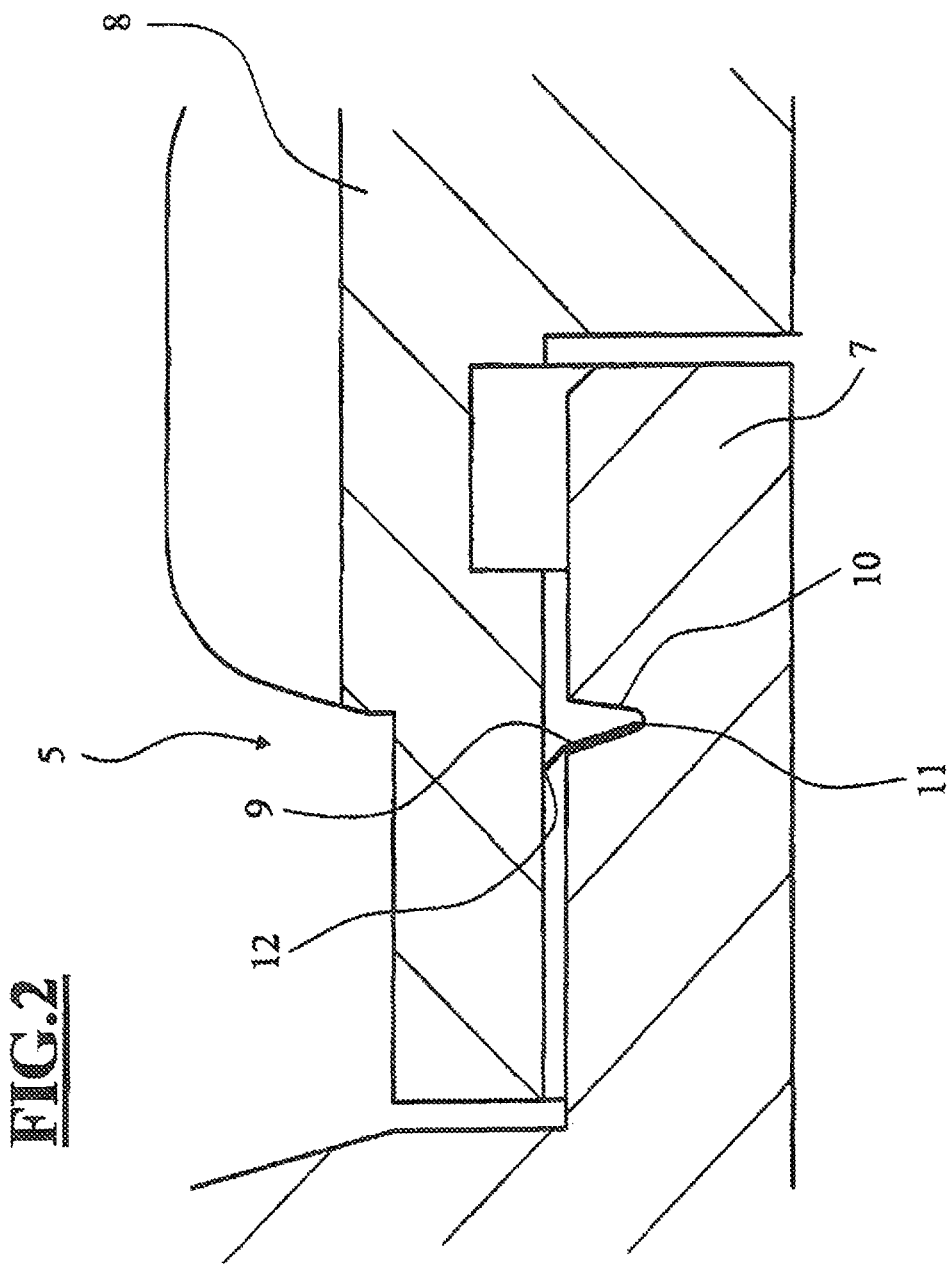

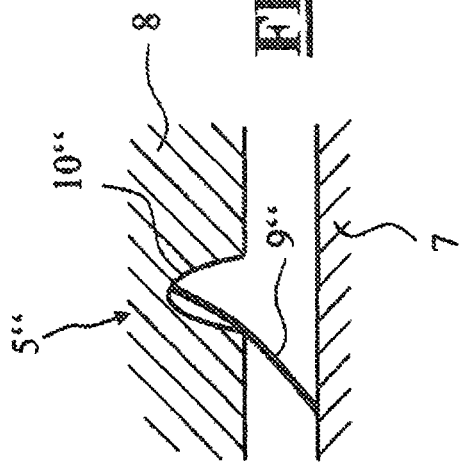
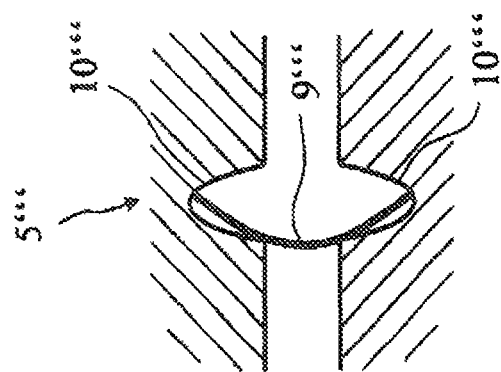
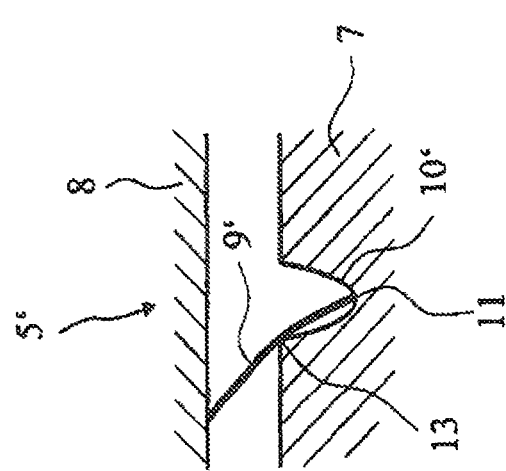

OBJECTIVE FOR A CAMERA

CROSS REFERENCE TO RELATED APPLICATIONS

This application is a continuation application of international patent application PCT/EP2011/062847, filed Jul. 26, 2011, designating the United States and claiming priority from German application 10 2010 039 423.8, filed Aug. 17, 2010, and the entire content of both applications is incorporated herein by reference.

FIELD OF THE INVENTION

The invention relates to an objective for a video or still camera having an inner objective element and an outer objective element, which at least partly surrounds the inner objective element. The inner objective element and the outer objective element are arranged in such a way that they are rotatable with respect to one another about an axis. The objective furthermore comprises a sealing system between the inner objective element and the outer objective element.

BACKGROUND OF THE INVENTION

Objectives of the kind mentioned at the outset are normally composed of many different components such as lenses, mounts, housings and control elements, which, in the following text, are subsumed under the term "objective elements". A common stipulation during the development of an objective is that one or more components in the interior of the objective, for example an optical system, be protected to the best possible extent, from external influences such as spray or dust. To this end, provision is often made for seals or sealing systems between the individual objective elements. It is comparatively easy to seal objective elements which are arranged immobile relative to one another by means of a multiplicity of known sealing techniques. It is difficult to seal moveable objective elements in a durable and reliable fashion.

U.S. Pat. No. 4,440,403 discusses this problem and discloses a waterproof and dust-proof seal for a rotatable operating element of a camera. The housing of the camera has an annular projection over which the rotatable operating element is arranged. The seal comprises an intermediate ring, which is placed in rotatable fashion on the annular projection, and a flexible sealing ring, which forms the connection between the intermediate ring and the operating element. The inventive concept can also be applied to an objective tube.

U.S. Pat. No. 4,168,897 furthermore discloses a focus adapter for an underwater camera, which is connected to the camera with a seal.

SUMMARY OF THE INVENTION

It is an object of the invention to provide an objective with a sealing system which is distinguished by having a simple configuration and is easy to mount and has a robust and free-moving structure.

According to a feature of the invention, the sealing system comprises a polymer film which is in contact with the inner objective element and the outer objective element. Here, the term "film" should be understood to mean elements which have an embodiment which is smaller by one or more orders of magnitude in one spatial dimension than in the other two spatial dimensions. Polymer films are cost effective and can easily be produced and can be adapted without problems to given installation conditions. Moreover, the use of polymer films in sealing systems only requires a few simple structural changes in the objective elements to be sealed.

In one embodiment of the invention, the polymer film is in linear contact with the inner objective element. Here, the contact between the polymer film and the inner objective element can be formed along a closed line, or along an open or interrupted line. As a result of the linear contact, it is possible to utilize elasticity of the polymer film, in particular bending elasticity, in order to increase a contact pressure of the polymer film on a surface of the inner objective element and thereby ensure a secure seal with respect to the inner objective element.

In a further embodiment of the invention, the linear contact between the polymer film and the inner objective element occurs at a first edge of the polymer film. At a first edge, the polymer film therefore rests linearly against a surface of the inner objective element. Such a connection, firstly, can be assembled in a particularly simple fashion and, secondly, is distinguished by a good sealing effect as a result of a favorable contact pressure.

As an alternative or in addition thereto, the polymer film is, in a further embodiment of the invention, in linear contact with the outer objective element. Here, the contact between the polymer film and the outer objective element can be formed along a closed line or along an open or interrupted line. As a result of the linear contact, it is possible, analogously to the inner objective element, to utilize elasticity of the polymer film, in particular bending elasticity, in order to increase a contact pressure of the polymer film on a surface of the outer objective element and thereby ensure a secure seal between polymer film and outer objective element.

In a further embodiment of the invention, the linear contact between the polymer film and the outer objective element occurs at a second edge of the polymer film. At a second edge, the polymer film therefore rests linearly against a surface of the outer objective element. Such a connection, firstly, can be assembled in a particularly simple fashion and, secondly, is distinguished by a good sealing effect as a result of a favorable and comparatively high contact pressure.

In a further embodiment of the invention, the polymer film has an annular configuration and thus enables an encircling, more particularly closed contact with the inner objective element and/or with the outer objective element. Here, an annular configuration should be understood to mean a closed figure which, more particularly but not exclusively, can be embodied as a circular ring.

In a further embodiment of the invention, the inner objective element and the outer objective element are arranged rotatable with respect to one another in a concentric fashion, As a result, there are at best small variations in the clearance when the objective elements are rotated relative to one another, as a result of which the seal between the objective elements is simplified.

In a further embodiment of the invention, a first groove in which the polymer film rests is formed in the inner objective element. The groove stabilizes the position of the polymer film and reduces the risk of the polymer film slipping. This ensures a secure contact between the polymer film and the inner objective element.

The first groove has a V-shaped form in a further embodiment of the invention, and so the contact between polymer film and inner objective element is further improved. Here, the polymer film preferably at least partly rests in the groove base of the V-shaped first groove. As a result of the V-shaped groove, the polymer film is held securely and secured against axial slippage.

In a further embodiment of the invention, the polymer film additionally rests against a transition from the first groove to a surface of the inner objective element. As a result of the additional contact between polymer film and inner objective element, the polymer film is held in a defined position, particularly in the radial direction. Moreover, a sealing effect between the polymer film and the inner objective element is improved by the contact at at least two spaced-apart points.

In a further embodiment of the invention, a second groove in which the polymer film rests is formed in the outer objective element. The groove stabilizes the position of the polymer film and reduces the risk of the polymer film slipping. This ensures a secure contact between the polymer film and the inner objective element.

The second groove has a V-shaped form in a further embodiment of the invention, and so the contact between polymer film and outer objective element is further improved. Here, the polymer film preferably at least partly rests in the groove base of the V-shaped second groove. As a result of the V-shaped groove, the polymer film is held securely and secured against axial slippage.

In a further embodiment of the invention, the polymer film additionally rests against a transition from the second groove to a surface of the outer objective element. As a result of the additional contact between polymer film and outer objective element, the polymer film is held in a defined position, particularly in the radial direction. Moreover, a sealing effect between the polymer film and the outer objective element is further improved by the contact at at least two spaced-apart points.

In a further embodiment of the invention, a width of the polymer film is matched to a clearance between the outer objective element and the inner objective element such that a secure seal is provided in all operating conditions. Here, the width of the polymer film is preferably greater than the sum of the clearance and the depth(s) of the first and/or second groove such that a flexural strain is produced in the polymer film after installation, which in turn brings about an increased contact pressure and an improved seal at the contact points between the polymer film and the inner and outer objective elements.

In a further embodiment of the invention, a thickness of the polymer film is selected in such a way that the film is configured to foe elastic in the direction of the rotational axis between the inner objective element and the outer objective element. Elasticity within the meaning of this invention is present if the polymer film is able to change its shape under the influence of a maximum external force and/or a maximum external torque to be expected during normal operation, and to return, at least approximately, to an original shape once the force or the torque drops off. It should be noted that the elasticity of the polymer film, in addition to the thickness of the film, is also dependent on the material properties of the polymer and on the geometry of the film.

In a further embodiment of the invention, the polymer film, is made of polyethylene terephthalate or polypropylene. The film can be made in a very simple and cost effective manner from these materials. Polypropylene is also known by the trademark Formex.

In a further embodiment of the invention, the polymer film is made of biaxially oriented polyester film. These films are also known by the trademarks HOSTAPHAN, MYLAR and MELINEX. They are distinguished by particular robustness, low slippage resistance and insensitivity with respect to additional lubricants such as grease.

In a further embodiment of the invention, the polymer film is made of a thermoplastic polymer, in particular of cellulose acetate. Cellulose acetate is distinguished by great toughness and low abrasion in the case of mechanical loads.

BRIEF DESCRIPTION OF THE DRAWINGS

The invention will now be described with reference to the drawings wherein:

FIG. 1 is a section of an objective according to the invention with sealing system;

FIG. 2 is an embodiment of the sealing system;

FIG. 3 is another embodiment of the sealing system;

FIG. 4 is a further embodiment of the sealing system; and,

FIG. 5 is still another embodiment of the sealing system.

DESCRIPTION OF THE PREFERRED EMBODIMENTS OF THE INVENTION

FIG. 1 illustrates a section through an upper part of an objective 1 for a camera, for example for a single-lens reflex camera. The objective 1 comprises an objective housing 4 and an optical system in the interior 2 of the objective housing 4. The optical system (not illustrated in FIG. 1) comprises a multiplicity of optical elements such as lenses and/or mirrors and enables imaging an object outside of the objective onto a film or sensor plane. In this embodiment, the optical system includes a plurality of lenses, which are held in different structural elements 6.

The objective housing 4 includes a multiplicity of objective elements, which are moveably arranged relative to one another. Thus, the lenses or various groups of lenses of the optical system are mounted moveably with respect to one another in the objective 1 in order to undertake focusing and/or a change in the focal length. Furthermore, provision is made on the outside of the objective for adjustment rings or adjustment buttons, which can be adjusted or displaced relative to other objective elements and by means of which the basic functions of the objective such as focal length, aperture and/or focusing can be set. Provision can moreover be made on the objective for further moveable control elements for setting further objective functions such as image stabilization.

For the purpose of high quality recordings, it is necessary to protect the optical system in the interior 2 of the objective housing 4 and the sensitive movement mechanism to the best possible extent from external influences. To this end, the objective 1 must be embodied to be impervious to light from the side so that light can only enter through a front lens which closes off the objective 1 to the outside. Moreover, the optical system in the interior 2 of the objective housing 4 must be protected against penetration of foreign bodies such as dust or foreign liquids such as spray because these could otherwise be deposited on the lenses or in the movement mechanism and cause image defects or malfunctions.

The invention will be explained below using the example of a sealing system 5, which is arranged between an inner objective element in the form of a focus ring 7 for focusing the objective and an outer objective element in the form of an aperture ring 8 for setting an aperture. Here, the characterization as "inner" and "outer" objective element relates to the location of the sealing system, at which the aperture ring 8 surrounds the focus ring 7 in the radial direction. The focus ring 7 and the aperture ring 8 are embodied concentrically in a rotatable fashion about a common axis. In further exemplary embodiments, not illustrated in the figures, corresponding sealing systems can also be arranged between other objective elements, which more particularly are arranged concentrically in a rotatable fashion with respect to one another, for example between a shaft of an adjustment or setting button and a structural element 6 or between a plurality of structural elements 6 or between an adjustment ring and a structural element.

FIG. 2 illustrates the sealing system 5 in more detail. The sealing system 5 comprises an annular polymer film 9 which has been introduced into a V-shaped groove 10 in an outer surface of the focus ring 7. In this embodiment, the polymer film 9 rests flat against a side wall of the V-shaped groove 10. A first edge of the polymer film 9, embodied as inner edge 11, reaches as far as the base of the groove 10.

In a further embodiment, the inner edge 11 has a slightly smaller diameter than a diameter of the focus ring 7 in the base of the groove 10. This ensures a particularly tight contact between the polymer film 9 and the focus ring 7. A second edge of the polymer film 9, embodied as outer edge 12, is in linear contact with the aperture ring 8, with the contact in this embodiment being formed over the whole inner circumference of the aperture ring 8.

The polymer film 9 is made of a biaxially oriented polyester film. Such films are also known under the trademarks MYLAR, HOSTAPHAN and MELINEX. Biaxially oriented polyester films are distinguished by particular robustness and resistance to wear. Moreover, they are comparatively insensitive to conventional lubricants.

The width of the polymer film 9 in the radial direction is matched to a clearance between the focus ring 7 and the aperture ring 8. This means that the width is just so large that, in any position of the focus ring 7 with respect to the aperture ring 8, a secure, at least largely circumferential contact is ensured both between the polymer film 9 and the focus ring 7 and between the polymer film 9 and the aperture ring 8.

The thickness of the polymer film 9 is selected in such a way that the ring formed by the film has a bending elasticity in the axial direction, that is, in the direction of the rotational axis between the aperture ring 8 and the focus ring 7. Here, the thickness of the polymer film, the film geometry and Young's modulus of the material are matched to one another in such a way that the film is elastic under force and torque conditions typical under installation conditions. This means that the polymer film changes its shape under the influence of a maximum external force and/or a maximum external torque occurring during normal operation, and returns, at least approximately, to the original shape once the force and/or the torque drops off, with possible hysteresis effects being ignored.

As a result of the elastic embodiment, flexural strains occur in the installed state which leads to the curved profile of the polymer film 9 in the gap, as can be seen in FIG. 2. As a result of the flexural stress, pressure against the wall of the aperture ring 8 is generated by the polymer film 9 on the external edge 12, as a result of which a sealing effect is improved.

FIG. 3 illustrates a sealing system 5' from a further embodiment. The sealing system 5' differs from the above-described embodiment by virtue of the fact that the thickness of the polymer film 9', the geometry and Young's modulus of the material are matched to one another in such a way that the annular polymer film 9' has a slightly lower bending elasticity such that the film rests against the groove base of the groove 10' with the inner edge 11 and, with a further point, against the transition 13 from the groove 10' to the surface of the focus ring 7. As a result of the double contact, there is a good sealing effect between the polymer film 9' and the focus ring 7.

FIG. 4 shows a sealing system 5" of a further embodiment. The sealing system 5" differs from the above-described embodiments by virtue of the fact that a V-shaped groove 10" is arranged not on an outer side of the focus ring 7 but on an inner side of the aperture ring 8. Here, the outer diameter of the polymer film 9" is preferably configured to be slightly larger than the diameter in the groove base in order to ensure a secure seat and a good sealing effect. The contact between the polymer film 9" and the aperture ring 8 can, like in the preceding embodiments, be formed flat or linearly.

FIG. 5 illustrates a sealing system 5'" from a further embodiment. V-shaped grooves 10'" are arranged both in the focus ring and in the aperture ring in this embodiment. Here, the grooves 10'" can be formed directly opposite to one another or with an offset in the axial direction.

The objective according to the invention is distinguished by virtue of the fact that objective elements arranged in the interior of the objective are well protected against external influences such as spray and dust. As a result of arranging a polymer film in a gap between an inner objective element and an outer objective element, a robust sealing system with a simple design is provided, which only requires little installation space and has a long service life. The sealing system can furthermore be mounted easily and allows for greater tolerances between the inner objective element, and the outer objective element, which are compensated for by the polymer film. It is further distinguished by lower friction during a rotation of the two objective elements relative to one another. Noise development during the movement of the objective elements is largely suppressed. Thermal expansions as a result of temperature variations can easily be compensated for. Compared to a conventional objective with an elastomeric seal, the objective according to the invention has significantly less friction and a reduced sensitivity with respect to clearance tolerances.

It is understood that the foregoing description is that of the preferred embodiments of the invention and that various changes and modifications may be made thereto without departing from the spirit and scope of the invention as defined in the appended claims.

What is claimed is:

1. An objective for a camera, the objective defining an axis and comprising:
    an inner objective element;
    an outer objective element at least partially surrounding said inner objective element;
    said inner objective element and said outer objective element conjointly defining an interface and being mounted so as to be rotatable relative to each other about said axis;
    a sealing system disposed at said interface between said inner objective element and said outer objective element; and,
    said sealing system including a plastic foil in contact engagement with said inner objective element and said outer objective element;
    wherein an edge of said plastic foil is in linear contact engagement with at least one of said inner objective element and said outer objective element;
    wherein said plastic foil is made from a material and has a thickness selected so as to cause said plastic foil to be elastically configured in the direction of said axis; and,
    wherein said plastic foil has a curved profile in an installed state to generate pressure in a radial direction.

2. The objective of claim 1, wherein said edge is a first edge in linear contact engagement with said inner objective element.

3. The objective of claim 1, wherein said edge is a second edge in linear contact engagement with said outer objective element.

4. The objective of claim 3, wherein said plastic foil is an annularly-shaped plastic foil.

5. The objective of claim 4, wherein said inner objective element and said outer objective element are concentrically rotatable relative to each other.

6. The objective of claim 4, wherein said inner objective element has a first groove formed therein against which said plastic foil lies.

7. The objective of claim 6, wherein said first groove has a V-shape when viewed in section.

8. The objective of claim 6, wherein said inner objective element has a surface facing toward said outer objective element and said surface and said first groove conjointly define a first transition; and, said plastic foil lies against said first transition.

9. The objective of claim 8, wherein said outer objective element has a second groove formed therein against which said plastic foil lies.

10. The objective of claim 9, wherein said second groove has a V-shape when viewed in section.

11. The objective of claim 9, wherein said outer objective element has a surface facing toward said inner objective element and said surface of said outer objective element and said second groove conjointly define a second transition; and, said plastic foil lies against said second transition.

12. The objective of claim 11, wherein said plastic foil has a width adapted to the clearance between said outer objective element and said inner objective element.

13. The objective of claim 1, wherein said material is polyethylene terephthalate or polypropylene.

14. The objective of claim 1, wherein said material is a biaxial orientated polyester foil.

15. The objective of claim 1, wherein said material is a thermoplastic plastic.

16. The objective of claim 1, wherein said camera is a still camera or a video camera.

17. An objective for a camera, the objective defining an axis and comprising:
    an inner objective element;
    an outer objective element;
    said inner objective element and said outer objective element conjointly defining an interface and being mounted so as to be rotatable relative to each other about said axis;
    a sealing system disposed at said interface between said inner objective element and said outer objective element; and,
    said sealing system including a plastic foil in contact engagement with said inner objective element and said outer objective element;
    wherein an edge of said plastic foil is in linear contact engagement with at least one of said inner objective element and said outer objective element;
    wherein said plastic foil is made from a material and has a thickness selected so as to cause said plastic foil to be elastically configured in the direction of said axis; and,
    wherein said plastic foil has a curved profile in an installed state to generate pressure in a radial direction.

* * * * *